June 17, 1958  C. LUKE  2,839,022
VISUAL CARGO SHIFTING INDICATOR
Filed May 2, 1957  2 Sheets-Sheet 1
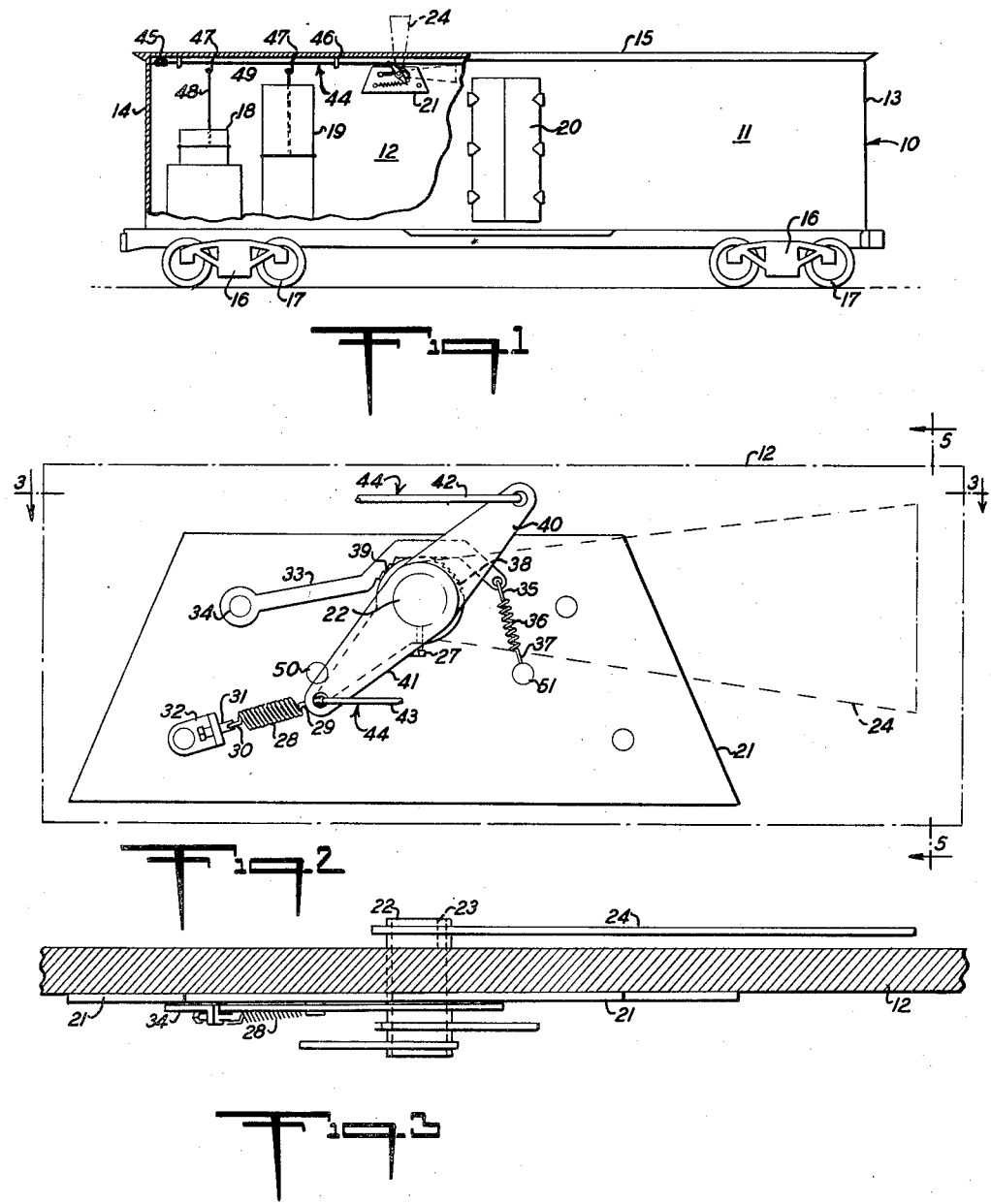
INVENTOR
CLARK LUKE
BY
ATTORNEYS June 17, 1958 C. LUKE 2,839,022
VISUAL CARGO SHIFTING INDICATOR
Filed May 2, 1957 2 Sheets-Sheet 2
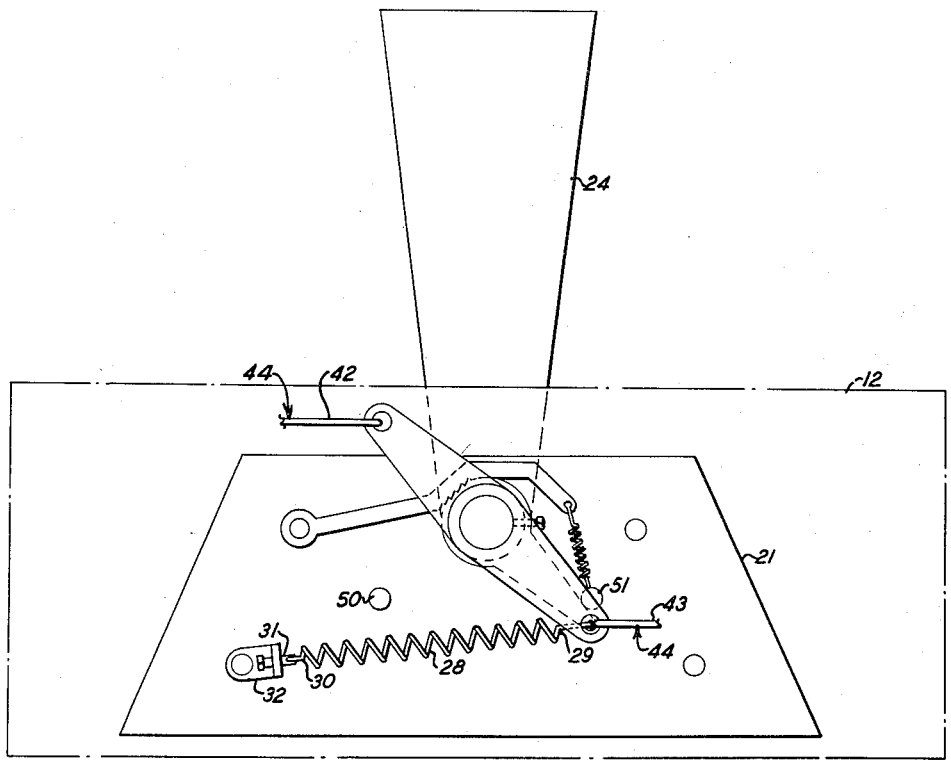
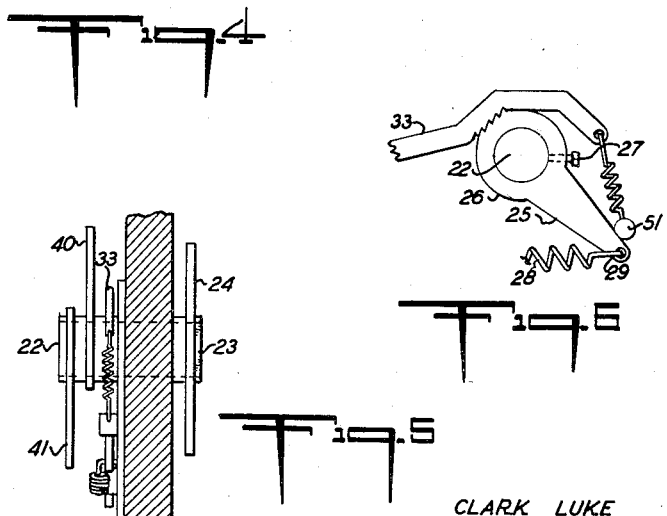
INVENTOR
CLARK LUKE
BY *Jacobi y Jacobi*
ATTORNEYS

United States Patent Office 2,839,022
Patented June 17, 1958

2,839,022

VISUAL CARGO SHIFTING INDICATOR

Clark Luke, Schenley, Pa.

Application May 2, 1957, Serial No. 656,611

10 Claims. (Cl. 116—114)

This invention relates to transportation and more particularly to a visual indicator which may be installed on a freight car, truck, aircraft or any other vehicle suitable for transporting a cargo and to provide an exterior visual indication as to whether or not the cargo contained therein has shifted from original position.

A great deal of the damage resulting to cargo during transportation thereof is caused by shifting of the same in the vehicle and much of this damage could be avoided if the fact that the cargo had started to shift, was known immediately whereupon proper steps could be taken to re-arrange or repack the cargo to prevent further shifting thereof. Heretofore, the fact that cargo had shifted in the vehicle has not become known until the vehicle arrives at its destination, with the result that there is frequent damage to the cargo and the cost of such damage to the transportation companies, as well as the inconvenience to the shippers and consignees is of major importance.

It is accordingly an object of the invention to provide a visual cargo shifting indicator which may be conveniently installed on existing vehicles and which will immediately provide a visual indication as to whether or not the cargo therein has shifted.

A further object of the invention is the provision of a visual cargo shifting indicator which may be conveniently applied to existing transportation vehicles to provide an indication as to whether or not cargo therein has shifted and in the event such shifting has taken place, means is provided to maintain the indicator in position to indicate such shifting, regardless of further shifting of the cargo in the vehicle.

A still further object of the invention is the provision of a visual cargo shifting indicator which may be conveniently applied to cargo carrying vehicles and which may be conveniently utilized to indicate the shifting of cargo, regardless of the particular character of such cargo.

Another object of the invention is the provision of a visual cargo shifting indicator which may be applied to cargo carrying vehicles and which will serve to provide an indication of even a slight shifting of the cargo therein and to maintain such indication until the indicator is reset.

A further object of the invention is the provision of a visual cargo shifting indicator which may be conveniently installed on cargo carrying vehicles and in which means is provided to vary the force required to actuate the indicator upon shifting of the cargo thereby eliminating operation of the indicator as the result of normal movement or shifting of the cargo.

Further objects and advantages of the invention will be apparent from the following description taken in conjunction with the accompanying drawing wherein:

Fig. 1 is a side elevational view of a conventional freight car with parts broken away and in section for greater clarity and showing a cargo shifting indicator constructed in accordance with this invention installed thereon;

Fig. 2 a side elevational view of the mechanism comprising the cargo shifting indicator of this invention and with the signal flag in down or inoperative position;

Fig. 3 a sectional view taken substantially on the line 3—3 of Fig. 2;

Fig. 4 a side elevational view similar to Fig. 2, but showing the signal flag in upright or operative position;

Fig. 5 a sectional view taken substantially on the line 5—5 of Fig. 2; and

Fig. 6 a fragmentary side elevational view showing the structure and operation of the ratchet arm and locking pawl.

With continued reference to the drawing, there is shown a conventional freight car 10 having the usual sidewalls 11 and 12, end walls 13 and 14, a roof 15 and trucks 16, rotatably mounting rail engaging wheels 17. Disposed within the freight car 10 is a suitably packed cargo, such as crates or boxes 18 and 19 and the conventional access door 20 is provided in the sidewall 11 of the car 10. While a freight car has been shown for convenience of illustration and the crates or boxes 18 and 19 have been shown as the cargo, it is to be understood, that this is for illustrative purposes only and that the vehicle may as well be a truck, aircraft, boat or any other vehicle and that the cargo carried thereby may be of any nature whatsoever, since the cargo shifting indicator constructed in accordance with this invention may be installed in any of these vehicles and suitably connected to a cargo of any type to immediately provide an exterior visual indication of the shifting of such cargo.

The cargo shifting indicator of this invention may well comprise a mounting plate 21 of suitable strength and rigidity which may be secured to the sidewall 12 of the vehicle 10 or at any other desired location and rotatably mounted in the plate 21 and extending through the sidewall 12 of the vehicle 10 is a shaft 22 which is provided on the outer end thereof with a flattened surface 23 to receive a substantially rigid signal flag 24 which is also provided with an aperture and a complementary flattened surface to engage over the outer end of the shaft 22 and be fixed thereon against rotation with respect to the shaft 22. While for convenience of illustration, the shaft 22 is shown as extending through only one sidewall 12 of the vehicle 10, obviously if desired, such shaft may extend entirely across the vehicle and through the opposite sidewall 11 and a second indicating or signal flag 24 may be also attached to the opposite end of the shaft, in order to provide a visual indicator on both sides of the vehicle 10.

With particular reference to Fig. 6, a ratchet arm 25 having a hub 26 is received over the shaft 22 adjacent the inner surface of the mounting plate 21 and the hub 26 is fixed against rotation with respect to the shaft 22 by means of a set screw 27 extending through the hub 26 and engaging the surface of the shaft 22. A tension spring 28 has one end 29 connected to the end of the ratchet arm 25 and the opposite end 30 of the spring 28 is secured to an adjusting means, such as a screw 31 threadedly mounted in a bracket 32 secured to the mounting plate 21. The purpose and operation of the spring 28 and adjustable mounting of the end 30 thereof will be presently described.

A locking pawl 33 is pivotally mounted at 34 on the mounting plate 21 and the pawl 33 extends over the hub 26 of the ratchet arm 25 and the opposite end of the pawl 33 is secured to one end 35 of a tension spring 36, the opposite end 37 of which is fixed to the mounting plate 21. Tension spring 36 serves to yieldably maintain the locking pawl 33 in engagement with the hub 26 of the ratchet arm 25. The hub 26 of the ratchet arm 25 is provided with ratchet teeth 38 on the periphery thereof and complementary teeth 39 are provided on the locking pawl 33. It will be seen from an inspection of Fig. 2, that the teeth 38 face in one direction, while the teeth 39 on the locking pawl 33 face in the opposite direction. As a result, when the shaft 22 and ratchet arm 25 are moved to the position shown in Figs. 4 and 6, the teeth 39 on the locking pawl 33 will engage the teeth 38 on the ratchet arm 25 to retain the ratchet arm and shaft 22 in position.

A pair of oppositely extending actuating arms 40 and 41 may be fixed to the shaft 22 by set screws or other suitable means, not shown, and to the outer ends of actuating arms 40 and 41 may be connected the opposite ends 42 and 43 of a cable or other flexible means 44 which extends entirely around the vehicle 10 adjacent the roof 15 thereof, the cable 44 being supported by suitable pulleys 45 and guide means 46 in order to maintain the same in position above the cargo in the vehicle 10. While the cable 44 is shown as extending entirely around the vehicle, the same may be installed in various ways in order to accommodate various types of cargo. A plurality of hooks or other attaching means 47 may be fixed to the cable 44 at spaced points and flexible means, such as wires or cables 48 and 49 may be attached to the hooks 47 and in turn, secured to individual units 18 and 19 of the cargo in the vehicle 10. Of course, the cables or wires 48 and 49 may be secured to the cargo in any desired manner and as may be dictated by the character of the cargo, the only requirement being that in the event such cargo shifts or moves in any direction, that a pull will be exerted on the wires or cables 48 and 49 which in turn will exert a pull on the cable 44 extending around the vehicle 10 and connected to the actuating arms 40 and 41 of the indicating mechanism.

In operation, it is assumed that cargo is packed in the vehicle 10 in the prescribed manner and as such packing proceeds, the flexible wires or cables 48 and 49 or other suitable means will be connected to units of the cargo and to the hooks 47 on the cable 44 and it is also to be assumed that the signal flag 24 is in the down or inoperative position, as shown in Fig. 2. The adjustable connection 31 for the tension spring 28 is so adjusted as to prevent rotation of the shaft 22 and movement of the signal flag 24 until a predetermined pull has been exerted on the cable 44 and actuating arms 40 and 41 and for convenience, stop means in the form of studs 50 and 51 may be provided on the mounting plate 21 to engage the ratchet arm 25 and limit movement of the shaft 22 and signal flag 24 between the down or inoperative position shown in Fig. 2 and the up or operative position shown in Fig. 4.

Assuming that the cargo has been packed in the vehicle 10 and the flexible wires or cables 48 and 49 properly attached thereto, upon shifting of the cargo in any direction, it will be seen that a pull will be exerted on the cable 44 which will result in rotating the shaft 22 to move the signal flag 24 toward the up or operative position shown in Fig. 4 and as soon as the movement has been sufficient to enable the teeth 39 on the locking pawl 33 to engage the teeth 38 on the hub 26 of the ratchet arm 25, the shaft 22 and signal flag 24 will be retained in such position and reverse movement thereof will be impossible until the locking pawl 33 is tripped or raised in order to disengage the teeth 39 from the ratchet teeth 38. If the shifting of the cargo is sufficient to move the signal flag 24 to the upper or operative position shown in Fig. 4, the same will be retained in such position and also if shifting of the cargo is only a partial one, the signal flag 24 will be retained at some position between the inoperative and operative positions. If the shifting of the cargo is only very minor and such as would not tend to result in damage thereto, the pull on the cable 44 and actuating arms 40 and 41 may not be sufficient to overcome the tension of spring 28 or if such tension is overcome and there is still only a slight shifting, the signal flag 34 will not be raised a sufficient distance to enable the ratchet teeth 38 on the hub 26 to engage the teeth 39 on the locking pawl 33 and continued minor shifting of the cargo might well result in the signal flag 24 returning to the lower inoperative position, as shown in Fig. 2. However, upon any major shifting of the cargo, such as would result in damage thereto, the signal flag will be moved a sufficient distance to be visible above the roof 15 of the vehicle 10 and also the teeth on the hub and locking pawl will engage to retain such flag in position and upon further shifting of the cargo, the flag would be raised to fully up or operative position and retained therein by the engagement of the above mentioned teeth.

The provision of a cargo shifting indicator in accordance with this invention will provide means whereby the shifting of cargo within a vehicle will be immediately noted and such steps as may be necessary may be taken to repack the cargo in order to prevent undue damage thereto. The cargo shifting indicator of this invention also provides a means whereby the location of the vehicle at the time cargo shifting took place may be determined thereby indicating what corrective measures, if any, need be taken in the handling of such vehicle at this location in order to prevent future shifting of cargo in other vehicles. In other words in this way, damage to cargo will be minimized and the consequent damage claims resulting from damaged cargo will also be reduced to a minimum.

It will be seen that by the above described invention, there has been provided a relatively simple, yet highly effective visual cargo shifting indicator which may be conveniently applied to existing vehicles or incorporated in new vehicles and one which may be conveniently and economically manufactured from readily available materials and installed at a minimum cost.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A visual cargo shifting indicator comprising a mounting plate for attachment to a wall of a cargo carrying vehicle, a rotatably mounted shaft extending through said plate and the wall of the vehicle and projecting inwardly of said plate, a rigid signal flag fixed to said shaft exteriorly of the vehicle, a ratchet arm including a hub fixed to said shaft adjacent the inner surface of said plate, ratchet teeth on the periphery of said hub, a locking pawl pivotally mounted on said plate and having teeth engageable with said ratchet teeth to prevent rotation of said shaft in one direction and permit rotation in the opposite direction, a tension spring connected to said pawl and said plate for yieldably holding said pawl in engagement with said hub, a second tension spring having one end attached to said ratchet arm and the opposite end adjustably attached to said plate whereby the tension in said second spring may be varied, a pair of oppositely extending actuating arms fixed to said shaft, a cable extending around the interior of said vehicle and movably supported by pulleys, one end of said cable being attached to one of said actuating arms and the opposite end of said cable being attached to the other actuating arm, a plurality of hooks fixed to said cable at spaced points and flexible means connecting one or more of said hooks with one or more cargo units whereby upon shifting of the cargo in any direction a pull will be exerted on said cable to rotate said shaft against the action of said second tension spring and move said flat to upright visible position, the teeth on said pawl engaging said ratchet teeth to hold said flag in visible position and upon release of said cable from the cargo and disengagement of said pawl said second spring will return said flag to inoperative position.

2. A visual cargo shifting indicator as defined in claim 1, in which said shaft extends through opposite walls of said vehicle and in which a signal flag is mounted on opposite ends of said shaft exteriorly of said vehicle.

3. A visual cargo shifting indicator comprising a mounting plate for attachment to a wall of a cargo carrying vehicle, a rotatably mounted shaft extending through said plate and the wall of the vehicle and projecting inwardly of said plate, a rigid signal flag fixed to said shaft exteriorly of the vehicle, a ratchet arm including a hub fixed to said shaft adjacent the inner surface of said plate, ratchet teeth on the periphery of said hub, a locking pawl pivotally mounted on said plate and having teeth engageable with said ratchet teeth to prevent rotation of said shaft in one direction and permit rotation in the opposite direction, resilient means for yieldably holding said pawl in engagement with said hub, a second tension spring having one end attached to said ratchet arm and the opposite end adjustably attached to said plate whereby the tension in said second spring may be varied, a pair of oppositely extending actuating arms fixed to said shaft, a cable extending around the interior of said vehicle and movably supported by pulleys, one end of said cable being attached to one of said actuating arms and the opposite end of said cable being attached to the other actuating arm, a plurality of hooks fixed to said cable at spaced points and flexible means connecting one or more of said hooks with one or more cargo units whereby upon shifting of the cargo in any direction a pull will be exerted on said cable to rotate said shaft against the action of said second tension spring and move said flag to upright visible position, the teeth on said pawl engaging said ratchet teeth to hold said flag in visible position and upon release of said cable from the cargo and disengagement of said pawl said second spring will return said flag to inoperative position.

4. A visual cargo shifting indicator comprising a mounting plate for attachment to a wall of a cargo carrying vehicle, a rotatably mounted shaft extending through said plate and the wall of the vehicle and projecting inwardly of said plate, a rigid signal flag fixed to said shaft exteriorly of the vehicle, a ratchet arm including a hub fixed to said shaft adjacent the inner surface of said plate, ratchet teeth on the periphery of said hub, a locking pawl pivotally mounted on said plate and having teeth engageable with said ratchet teeth to prevent rotation of said shaft in one direction and permit rotation in the opposite direction, resilient means for yieldably holding said pawl in engagement with said hub, a second tension spring having one end attached to said ratchet arm and the opposite end adjustably attached to said plate whereby the tension in said second spring may be varied, a pair of oppositely extending actuating arms fixed to said shaft, a cable extending around the interior of said vehicle, one end of said cable being attached to one of said actuating arms and the opposite end of said cable being attached to the other actuating arm, a plurality of hooks fixed to said cable at spaced points and flexible means connecting one or more of said hooks with one or more cargo units whereby upon shifting of the cargo in any direction a pull will be exerted on said cable to rotate said shaft against the action of said second tension spring and move said flag to upright visible position, the teeth on said pawl engaging said ratchet teeth to hold said flag in visible position and upon release of said cable from the cargo and disengagement of said pawl said second spring will return said flag to inoperative position.

5. A visual cargo shifting indicator comprising a mounting plate for attachment to a wall of a cargo carrying vehicle, a rotatably mounted shaft extending through said plate and the wall of the vehicle and projecting inwardly of said plate, a rigid signal flag fixed to said shaft exteriorly of the vehicle, a ratchet arm including a hub fixed to said shaft adjacent the inner surface of said plate, ratchet teeth on the periphery of said hub, a locking pawl pivotally mounted on said plate and having teeth engageable with said ratchet teeth to prevent rotation of said shaft in one direction and permit rotation in the opposite direction, resilient means for yieldably holding said pawl in engagement with said hub, a second tension spring having one end attached to said ratchet arm and the opposite end adjustably attached to said plate whereby the tension in said second spring may be varied, a pair of oppositely extending actuating arms fixed to said shaft, a cable extending around the interior of said vehicle, one end of said cable being attached to one end of said actuating arms and the opposite end of said cable being attached to the other actuating arm, means connecting said cable with one or more cargo units whereby upon shifting of the cargo in any direction a pull will be exerted on said cable to rotate said shaft against the action of said second tension spring and move said flag to upright visible position, the teeth on said pawl engaging said ratchet teeth to hold said flag in visible position and upon release of said cable from the cargo and disengagement of said pawl said second spring will return said flag to inoperative position.

6. A visual cargo shifting indicator comprising a mounting plate for attachment to a wall of a cargo carrying vehicle, a rotatably mounted shaft extending through said plate and the wall of the vehicle and projecting inwardly of said plate, a signal flag fixed to said shaft exteriorly of the vehicle, a ratchet arm including a hub fixed to said shaft adjacent the inner surface of said plate, ratchet teeth on said hub, a locking pawl pivotally mounted on said plate and having teeth engageable with said ratchet teeth to prevent rotation of said shaft in one direction and permit rotation in the opposite direction, resilient means for yieldably holding said pawl in engagement with said hub, a second tension spring having one end attached to said ratchet arm and the opposite end adjustably attached to said plate whereby the tension in said second spring may be varied, a pair of oppositely extending actuating arms fixed to said shaft, a cable extending around the interior of said vehicle, one end of said cable being attached to one of said actuating arms and the opposite end of said cable being attached to the other actuating arm, means connecting said cable with one or more cargo units whereby upon shifting of the cargo in any direction a pull will be exerted on said cable to rotate said shaft against the action of said second tension spring and move said flag to upright visible position, the teeth on said pawl engaging said ratchet teeth to hold said flag in visible position and upon release of said cable from the cargo and disengagement of said pawl said second tension spring will return said flag to inoperative position.

7. A visual cargo shifting indicator comprising a mounting plate for attachment to a wall of a cargo carrying vehicle, a rotatably mounted shaft extending through said plate and the wall of the vehicle and projecting inwardly of said plate, a signal flag fixed to said shaft exteriorly of the vehicle, a ratchet arm including a hub fixed to said shaft adjacent the inner surface of said plate, ratchet teeth on said hub, a locking pawl pivotally mounted on said plate and having teeth engageable with said ratchet teeth to prevent rotation of said shaft in one direction and permit rotation in the opposite direction, resilient means for yieldably holding said pawl in engagement with said hub, a spring having one end attached to said ratchet arm and the opposite end attached to said plate, a pair of oppositely extending actuating arms fixed to said shaft, a cable extending around the interior of said vehicle, one end of said cable being attached to one of said actuating arms and the opposite end of said cable being attached to the other actuating arm, means connecting said cable with one or more cargo units whereby upon shifting of the cargo in any direction a pull will be exerted on said cable to rotate said shaft against the action of said spring and move said flag to upright visible position, the teeth on said pawl engaging said ratchet teeth to hold said flag in visible position and upon release of said cable from the cargo and disengagement of said pawl said spring will return said flag to inoperative position.

8. A visual cargo shifting indicator comprising a mounting plate for attachment to a wall of a cargo carrying vehicle, a rotatably mounted shaft extending through said plate and the wall of the vehicle and projecting inwardly of said plate, a signal flag fixed to said shaft exteriorly of the vehicle, a ratchet arm including a hub fixed to said shaft adjacent the inner surface of said plate, ratchet teeth on said hub, a locking pawl pivotally mounted on said plate and having teeth engageable with said ratchet teeth to prevent rotation of said shaft in one direction and permit rotation in the opposite direction, resilient means for yieldably holding said pawl in engagement with said hub, a spring having one end attached to said ratchet arm and the opposite end attached to said plate, an actuating arm fixed to said shaft, means connecting said actuating arm with one or more cargo units whereby upon shifting of the cargo in any direction a pull will be exerted on said actuating arm to rotate said shaft against the action of said spring and move said flag to upright position, the teeth on said pawl engaging said ratchet teeth to hold said flag in visible position and upon release of said actuating arm from the cargo and disengagement of said pawl said spring will return said flag to inoperative position.

9. A visual cargo shifting indicator comprising a mounting plate for attachment to a wall of a cargo carrying vehicle, a rotatably mounted shaft extending through said plate and the wall of the vehicle and projecting inwardly of said plate, a signal flag fixed to said shaft exteriorly of the vehicle, a ratchet arm fixed to said shaft, a locking pawl pivotally mounted on said plate and having teeth engageable with said ratchet arm to prevent rotation of said shaft in one direction and permit rotation of said shaft in the opposite direction, resilient means for yieldably holding said pawl in engagement with said ratchet arm, a spring having one end attached to said ratchet arm and the opposite end attached to said plate, an actuating arm fixed to said shaft, means connecting said actuating arm with one or more cargo units whereby upon shifting of the cargo a pull will be exerted on said actuating arm to rotate said shaft against the action of said spring and move said flag to upright visible position, the teeth on said pawl engaging said ratchet arm to hold said flag in visible position and upon release of said actuating arm from the cargo and disengagement of said pawl said spring will return said flag to inoperative position.

10. A visual cargo shifting indicator comprising a mounting plate for attachment to the wall of a cargo carrying vehicle, a rotatably mounted shaft extending through said plate and the wall of the vehicle and projecting inwardly of said plate, a signal flag fixed to said shaft exteriorly of the vehicle, ratchet means fixed to said shaft, a locking pawl pivotally mounted on said plate and having teeth engageable with said ratchet means to prevent rotation of said shaft in one direction and permit rotation in the opposite direction, means for yieldably holding said pawl in engagement with said ratchet means, resilient means for rotating said shaft in one direction, an actuating arm fixed to said shaft, means connecting said actuating arm with one or more cargo units whereby upon shifting of the cargo a pull will be exerted on said actuating arm to rotate said shaft against the action of said resilient means and move said flag to upright visible position, the teeth on said pawl engaging said ratchet means to hold said flag in visible position and upon release of said actuating arm from the cargo and disengagement of said pawl said resilient means will return said flag to inoperative position.

References Cited in the file of this patent

UNITED STATES PATENTS

| 1,921,470 | Lane | Aug. 8, 1933 |
| 2,704,046 | Moraga | Mar. 15, 1955 |

FOREIGN PATENTS

| 658,450 | France | Jan. 25, 1929 |